(12) United States Patent
Piron

(10) Patent No.: US 6,411,532 B1
(45) Date of Patent: Jun. 25, 2002

(54) LOGIC INPUT DEVICE WITH ENERGY RECOVERY FOR AN INDUSTRIAL AUTOMATIC CONTROL SYSTEM

(75) Inventor: Patrick Piron, L'Isle d'Abeau (FR)

(73) Assignee: Soprano, Vaulx Milieu (FR)

(*) Notice: Subject to any disclaimer, the term of this patent is extended or adjusted under 35 U.S.C. 154(b) by 0 days.

(21) Appl. No.: 09/762,115

(22) PCT Filed: Aug. 4, 1999

(86) PCT No.: PCT/FR99/01929
§ 371 (c)(1),
(2), (4) Date: Jun. 28, 2001

(87) PCT Pub. No.: WO00/08529
PCT Pub. Date: Feb. 17, 2000

(30) Foreign Application Priority Data

Aug. 4, 1998 (FR) ............................................ 98 10169

(51) Int. Cl.[7] ............................................ H02M 3/335
(52) U.S. Cl. ............................................ 363/71; 363/20
(58) Field of Search ........................ 363/16, 20, 21.01, 363/21.04, 21.05, 21.07, 21.12, 21.13, 21.15, 65, 71, 95, 97, 131; 307/58, 71, 82, 83

(56) References Cited

U.S. PATENT DOCUMENTS 4,814,963 A * 3/1989 Petersen ...................... 363/20
5,682,303 A * 10/1997 Goad ........................... 363/71
5,796,595 A * 8/1998 Cross ........................... 363/16
6,061,252 A * 5/2000 Hosotani ...................... 363/16

FOREIGN PATENT DOCUMENTS

EP 0 540 373 A1 5/1993
EP 0 695 023 A1 1/1996

OTHER PUBLICATIONS

"The Forward Discharge Converter (FDC): A General Solution To Obtain Soft–Switching In Any Power Converter"; M.A. Perez et al.; Jun. 6, 1992, pp. 102–108.

* cited by examiner

Primary Examiner—Matthew Nguyen
(74) Attorney, Agent, or Firm—Oliff & Berridge, PLC

(57) ABSTRACT

An electronic equipment for onboard process control includes a first detection stage with a plurality input circuits, comprising each a first transformer having a primary coil connected to the corresponding input via a first hashing transistor, and a secondary coil connected to a diode rectifier circuit. A first clock sends control signals to the first hashing transistor. Adjusting means cooperate with the first clock for adjusting the frequency of the control signals or the cyclic ratio for adapting the voltage of said input circuit. A logic level detector is inserted in the secondary circuit of the first transformer, and is electrically connected to an acquisition circuit. A second recovery stage is connected to a battery supplying the equipment for restoring the energy drained by the input circuits of the first detection stage.

13 Claims, 4 Drawing Sheets

LOGIC INPUT DEVICE WITH ENERGY RECOVERY FOR AN INDUSTRIAL AUTOMATIC CONTROL SYSTEM

BACKGROUND OF THE INVENTION

The invention relates to a logic input device of an electronic equipment for an industrial automatic control system comprising a first detection stage having a plurality of input circuits and an acquisition circuit for acquisition of the input signals detected by said input circuits.

STATE OF THE TECHNIQUE

The logic input function implemented in electronic equipment for automatic control systems of on-board installations, in particular of rail transport vehicles, generally requires a large current in the logic inputs. The problem arising in conventional equipment is then that of heat dissipation in the measuring resistors, for a logic input at a voltage of 110 Volts for example, and with a current intensity of 10 mA, will dissipate a thermal power of 1.1 W. The global heat dissipation is naturally proportional to the number of logic inputs and often requires the use of cooling devices by heat sink or heat pipes to dissipate the heat to the outside. The electrical power supply of the equipment being performed from a safety power system with a backup battery bank, this results in addition in a loss of electrical power of the vehicle.

OBJECT OF THE INVENTION

The object of the invention is to achieve a logic input device with reduced heating and with electrical energy recovery.

The logic input device according to the invention is characterized in that each input circuit of the first detection stage comprises a first transformer having a primary winding connected to the corresponding input by means of a first chopping transistor, and a secondary coil connected to the diode rectifier circuit, a first clock is designed to send control signals to the first chopping transistor, adjustment means co-operate with the first clock for adjusting the frequency of the control signals or of the duty cycle for voltage adaptating of said input circuit, a logic level detector is inserted in the secondary or primary circuit of the first transformer and is electrically connected to the acquisition circuit, and a second recovery stage is connected to a battery supplying power to the equipment to restore the energy drained by the set of input circuits of the first detection stage.

The heat dissipation is thus reduced enabling the use of heat sinks to be avoided, resulting in addition in a saving of electrical energy due to the effect of energy restoration to the battery.

According to one feature of the invention, the logic level detector is formed by a resistor of a measuring shunt or by an opto-coupling element having a receiver delivering the input signal to the acquisition circuit.

According to one embodiment, the second energy recovery stage comprises a second voltage step-up transformer equipped with a primary winding electrically connected to the diode rectifier circuit of the first transformer, and with a secondary winding connected to the battery by means of a rectifying and filtering circuit with a diode and capacitor. A filtering capacitor is associated to the diode rectifier circuit of each input circuit, the filtering capacitor being inserted in the secondary circuit after the logic level detector.

The primary winding of the second transformer is electrically connected in series with a second chopping transistor controlled by a second clock. The second clock is in phase opposition with the first clock.

According to another feature of the invention, a voltage sensor is associated to the input of the second recovery stage and co-operates with a regulating circuit of the second clock to adjust the frequency of the chopping signals applied to the second transistor.

The second chopping transistor can be eliminated in the primary circuit of the second transformer if the voltage rectified by the input circuits is not filtered.

According to another embodiment, the second energy recovery stage is connected directly to the diode rectifier circuit of each input circuit of the first detection stage. A free-wheel diode is connected to the input of a filtering circuit and is moreover connected in parallel to the terminals of the secondary winding and of the rectifier diode.

BRIEF DESCRIPTION OF THE DRAWINGS

Other advantages and features will become more clearly apparent from the following description of several embodiments of the invention, given as non-restrictive examples only, and represented in the accompanying drawings, in which.

DESCRIPTION OF THE INVENTION

Figure 1:
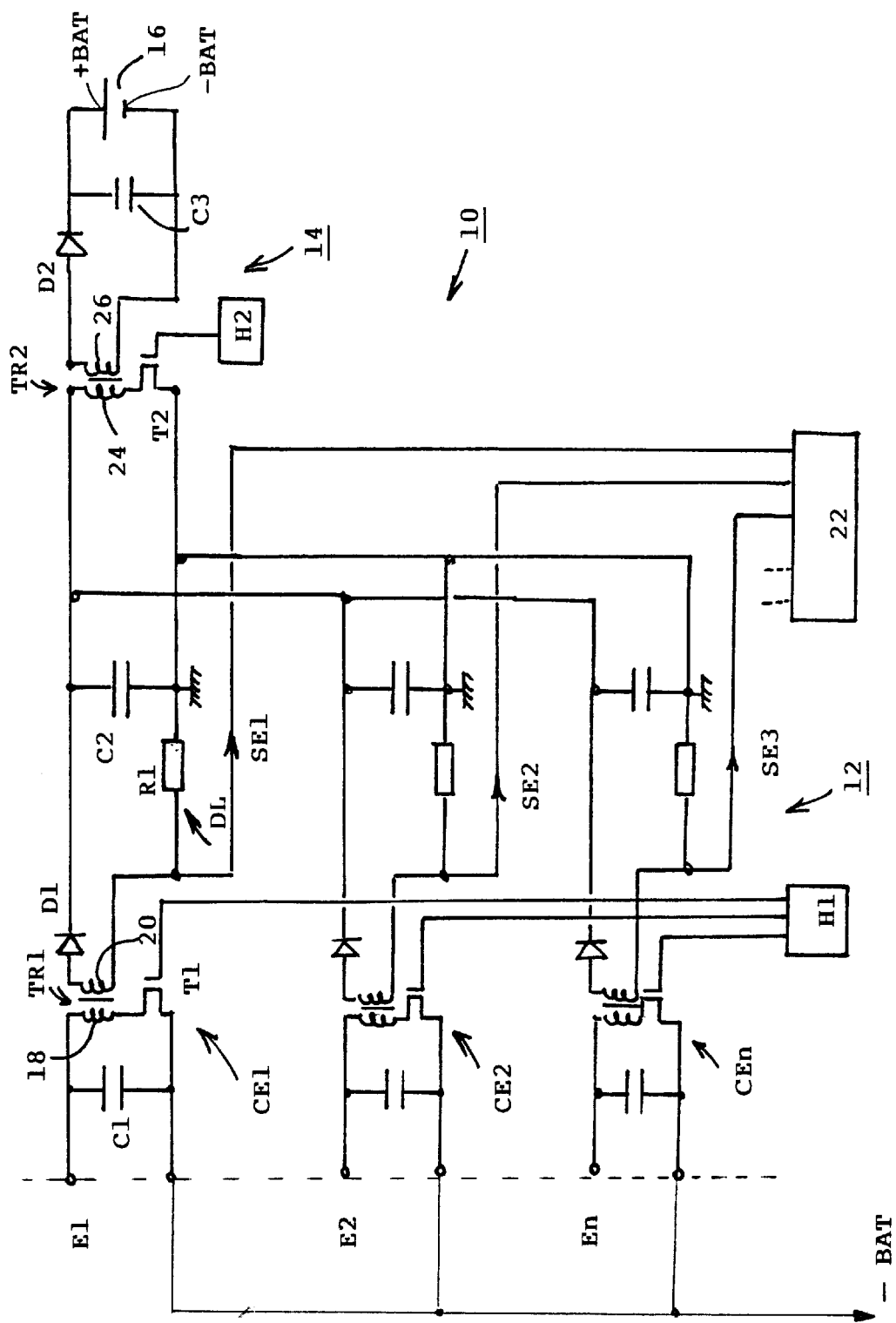
FIG. 1 is a schematic view of the two stages of the logic input device according to the invention, three of the n input circuits being represented for example purposes.

In FIG. 1, a logic input device 10 of an electronic equipment unit for an industrial automatic control system comprises a first detection stage 12 having a plurality of input circuits CE1, CE2, . . . CEn, and a second energy recovery stage 14 connected to a battery 16 or another DC supply having a positive pole +BAT and a negative pole −BAT.

The elementary input circuits CE1, CE2, . . . CEn of the first detection stage 12 are all identical to one another and are respectively connected to the inputs E1, E2, . . . En of the electronic equipment. The input circuits CE1, CE2, . . . CEn are also connected in parallel to the input of the common second energy recovery stage 14. In the following, only the input circuit CE1 of the first detection stage 12 will be described in detail.

The input circuit CE1 comprises a first transformer TR1 having a primary winding 18 connected to the input E1 by means of a first chopping transistor T1. A filtering capacitor C1 is connected in parallel to the terminals of the primary winding 18 in series with the first chopping transistor T1 so as to perform smoothing of the current to keep a logic input of the DC type. The first chopping transistor T1 is controlled by a first clock H1 designed to send control signals whose frequency is adjustable between 3–500 kHz.

The secondary winding 20 of the first transformer TR1 is connected to a rectifier diode D1 and to a measuring resistor R1 forming a logic level detector DL designed to deliver the logic input signal SE1 to an acquisition circuit 22 of the equipment. The input signals SE2, . . . SEn of the other input circuits CE2, . . . CEn are also applied to the same acquisition circuit 22.

A filtering capacitor C2 is connected in parallel between the cathode of the diode D1 and the resistor R1 of the measuring shunt, at the output of the secondary circuit of the first transformer TR1.

The input circuit CE1 of the first detection stage 12 works in constant current, as it is not equipped with a regulating circuit of the chopping signal. The source of the first MOS-type transistor T1 is connected for this purpose to a floating potential, formed for example by the ground or the negative pole of the battery 16. The input E1 is moreover voltage adaptive, either by adjusting the frequency of the signals from the first clock H1 or by adjusting its duty cycle.

The second recovery stage 14 common to all the input circuits CE1, CE2, . . . CEn comprises a second voltage step-up transformer whose primary winding 24 is connected to the terminals of the filtering capacitor C2 of each input circuit CE1, CE2, . . . CEn by means of a second chopping transistor T2. The secondary winding 26 of the transformer TR2 is connected to the battery 16 by means of a rectifying and filtering circuit formed by a diode D2 and a filtering capacitor C3.

The second MOS-type chopping transistor T2 is controlled by a second clock H2 delivering chopping signals in phase opposition with those of the first clock H1 so as to cause turn-on of the second transistor T2 during the turn-off phase of the first transistor T1, and vice-versa. The second stage 14 thus restores the energy drained by the set of input circuits CE1, CE2, . . . CEn of the first detection stage 12 to the battery 16.

Serial connection of the second recovery stage 14 with the first detection stage 12 to perform the logic input function reduces the heat dissipation at the level of the electronic equipment and enables an energy saving to be made due to recovery thereof by the second stage which restores this energy to the battery 16. Another advantage of such an arrangement is voltage adapting of the input signals by adjusting the duty cycle or the frequency of the first clock H1. Logic level detection is thus performed at the level of each input circuit CE1, CE2, . . . CEn without overheating and without degrading the energy consumed in the logic input device 10.

Figure 2:
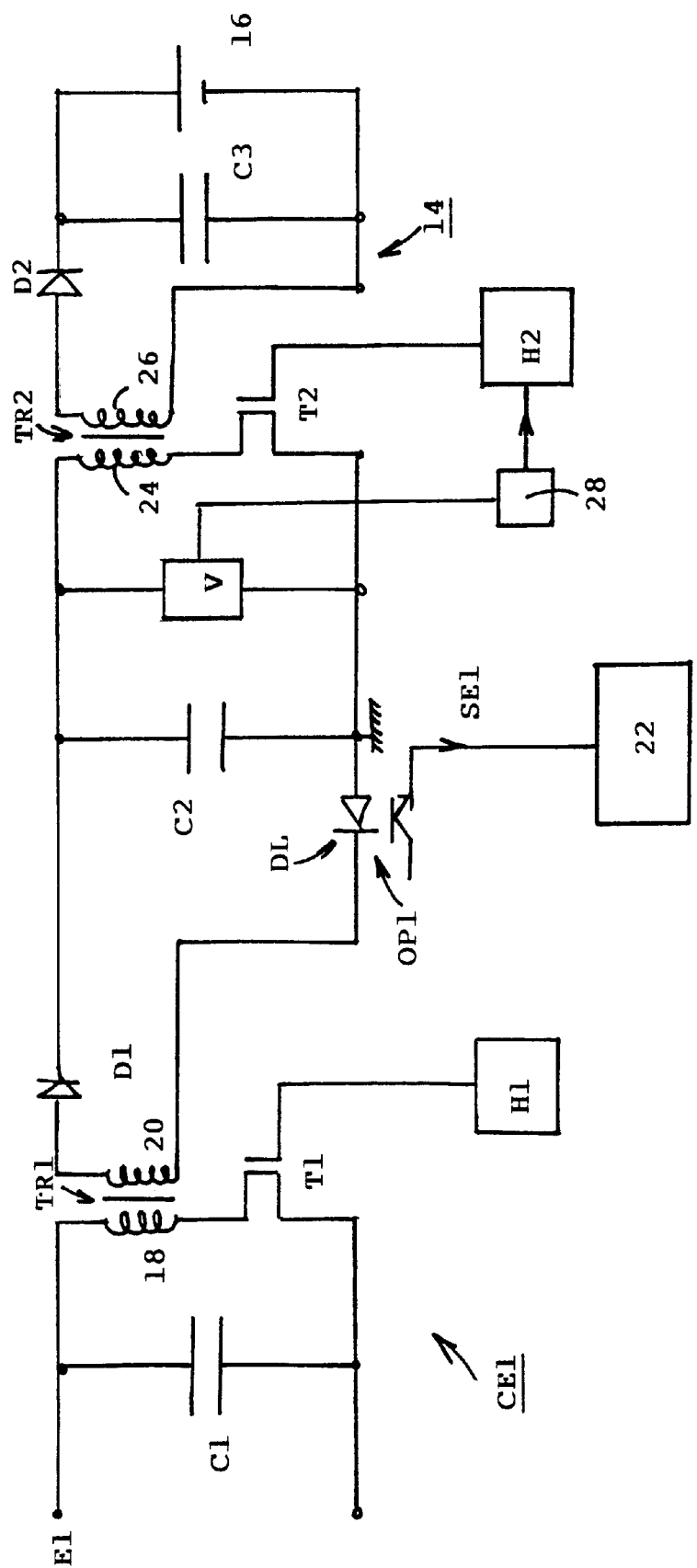
FIG. 2 shows the diagram of an alternative embodiment of an input circuit preceding the second recovery stage.

With reference to FIG. 2, the resistor R1 of the measuring shunt forming the logic level detector in each input circuit CE1, CE2, . . . CEn is replaced by an opto-coupling element OP1 whose receiver transmits the input signal SE1 to the acquisition circuit 22. A voltage sensor V can be advantageously connected to the terminals of the capacitor C2 to measure the voltage applied to the primary winding 24 of the second transformer TR2. A regulating circuit 28 of the second clock H2 is controlled by the voltage sensor V to adjust the frequency of the chopping signals applied to the second chopping transistor T2 according to the value of the voltage measured at the terminals of the capacitor C2 of the input circuit CE1.

Figure 3:
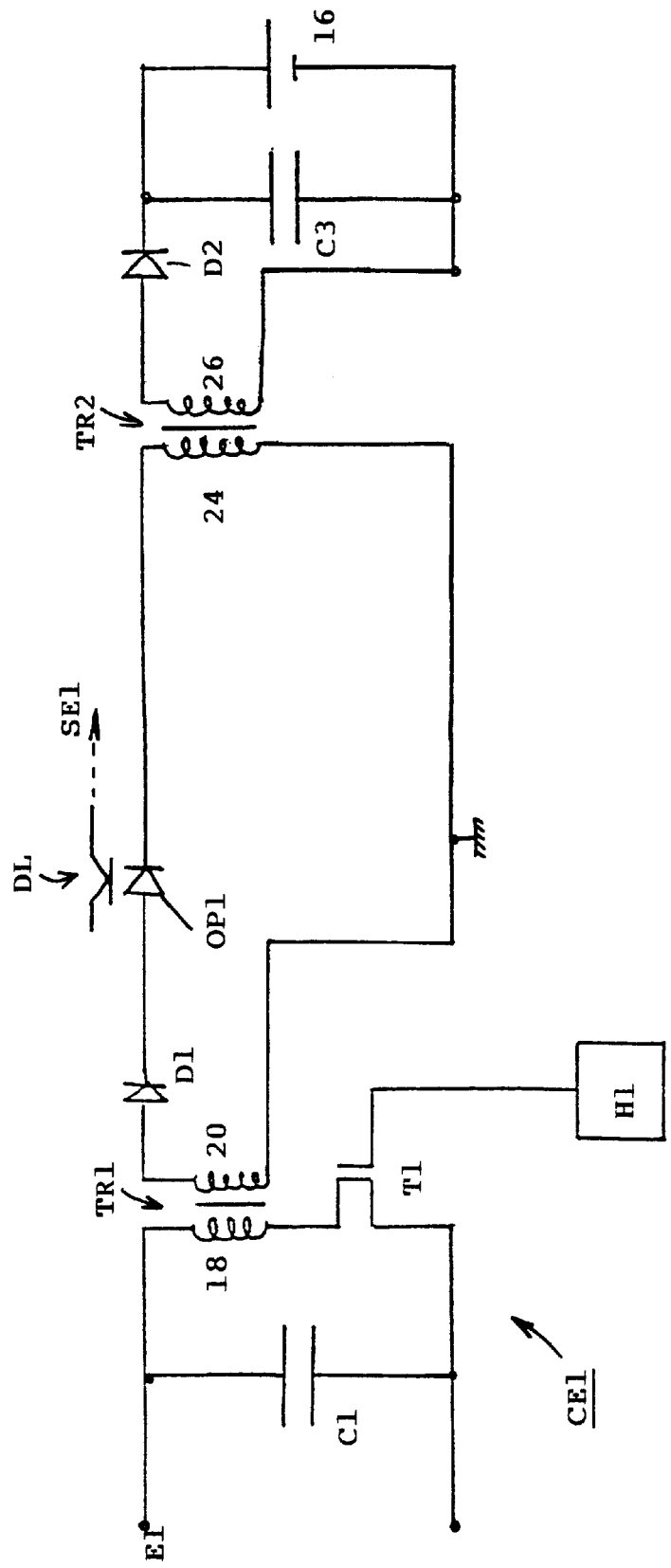
FIG. 3 is another alternative embodiment of FIG. 2.

In FIG. 3, the second chopping transistor T2 in the primary circuit of the second transformer TR2 can be eliminated after the filtering capacitor C2 in the input circuit CE1 has been removed. The voltage rectified by the diode D1 is then applied directly to the primary winding 24 and is then rectified by the diode D2 and filtered by the capacitor C3 before recharging the battery 16. The input signal SE1 is sent to the acquisition circuit 22 by means of the opto-coupler OP1 forming the logic level detector, which is arranged between the diode D1 and the primary winding 24.

It is clear that the rectifier diodes D1 and D2 can be replaced by diode bridges and that the MOS chopping transistors T1, T2 can be replaced by equivalent semi-conducting means, in particular FET transistors.

Figure 4:
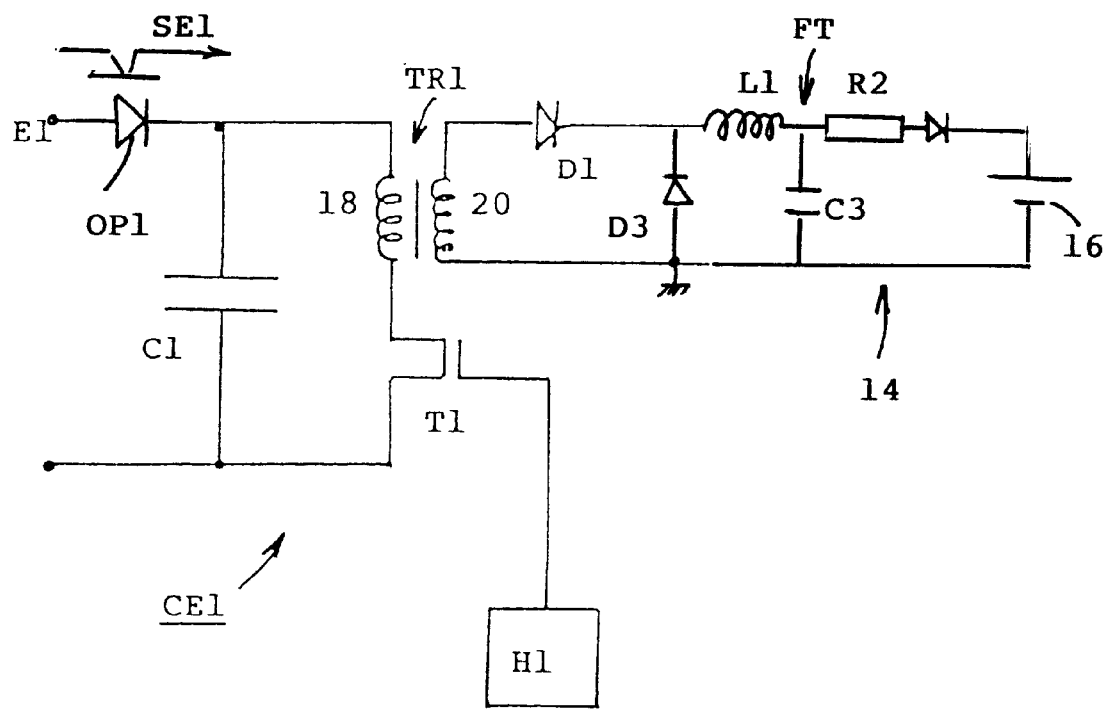
FIG. 4 is another alternative embodiment of FIG. 2 without a transformer in the recovery stage.

In FIG. 4, the energy recovery stage 14 is not equipped with the second transformer TR2. The rectifier diode D1 in series with the secondary winding 20 of the first transformer TR1 is connected to the battery 16 by means of a free-wheel diode D3 and a filtering circuit FT formed by an inductance coil L1, a resistor R2 and a capacitor C3. The opto-coupling element OP1 of the logic level detector DL is inserted in the primary circuit of the first transformer TR1, the anode of the opto-coupling element OP1 being connected to the input E1. It is clear that the opto-coupling element OP1 could also be inserted in the secondary circuit of the transformer TR1.

What is claimed:

1. A logic input device of an electronic equipment for an industrial automatic control system comprising a first detection stage (12) having a plurality of input circuits (CE1, CE2, . . . CEn), and an acquisition circuit (22) for acquisition of the input signals (SE1, SE2, . . . SEn) detected by said input circuits, wherein each input circuit (CE1, CE2, . . . CEn) of the first detection stage (12) comprises a first transformer (TR1) having a primary winding (18) connected to the corresponding input (E1, E2, . . . En) by means of a first chopping transistor (T1), and a secondary coil (20) connected to the diode rectifier circuit (D1), a first clock (H1) is designed to send control signals to the first chopping transistor (T1), adjustment means co-operate with the first clock (H1) for adjusting the frequency of the control signals or of the duty cycle for voltage adapting of said input circuit, a logic level detector (DL) is inserted in the secondary or primary circuit of the first transformer (TR1) and is electrically connected to the acquisition circuit (22), and a second recovery stage (14) is connected to a battery (16) supplying power to the equipment to restore the energy drained by the set of input circuits (CE1, CE2, . . . CEn) of the first detection stage (12).

2. The logic input device according to claim 1, wherein the logic level detector (DL) is formed by a resistor (R1) of a measuring shunt.

3. The logic input device according to claim 1, wherein the logic level detector (DL) comprises an opto-coupling element (OP1) having a receiver delivering the input signal (SE1, SE2, . . . SEn) to the acquisition circuit (22).

4. The logic input device according to claim 1, wherein the second energy recovery stage (14) comprises a second voltage step-up transformer (TR2) equipped with a primary winding (24) electrically connected to the diode rectifier circuit (D1) of the first transformer (TR1), and with a secondary winding (26) connected to the battery (16) by means of a rectifying and filtering circuit with a diode (D2) and capacitor (C3).

5. The logic input device according to claim 4, wherein a filtering capacitor (C2) is associated to the diode rectifier circuit (D1) of each input circuit (CE1, CE2, . . . CEn), the filtering capacitor being inserted in the secondary circuit after the logic level detector (DL).

6. The logic input device according to claim 5, wherein the primary winding (24) of the second transformer (TR2) is electrically connected in series with a second chopping transistor (T2) controlled by a second clock (H2).

7. The logic input device according to claim 6, wherein the second clock (H2) is in phase opposition with the first clock (H1), causing turn-on of the second transistor (T2) during the turn-off phase of the first transistor (T1), and vice-versa.

8. The logic input device according to claim 6, wherein a voltage sensor (V) is associated to the input of the second recovery stage (14) and co-operates with a regulating circuit (28) of the second clock (H2) to adjust the frequency of the chopping signals applied to the second transistor (T2).

9. The logic input device according to claim 1, wherein the terminal of the first transistor (T1) opposite the primary winding (18) is at a non-floating potential.

10. The logic input device according to claim 1, wherein the second energy recovery stage (14) is connected directly to the diode rectifier circuit (D1) of each input circuit (CE1, CE2, . . . CEn) of the first detection stage (12).

11. The logic input device according to claim 10, wherein the second energy recovery stage (14) comprises a free-wheel diode (D3) connected to the input of a filtering circuit (FT) and connected in parallel to the terminals of the secondary winding (20) and of the rectifier diode (D1).

12. The logic input device according to claim 11, wherein the filtering circuit (FT) comprises an inductance coil (L1) connected to the battery (16) by means of a resistor (R2), and a capacitor (C3) connected between the ground and a mid-point of the connection between the inductance coil (L1) and the resistor (R2).

13. The logic input device according to claim 7, wherein a voltage sensor (V) is associated to the input of the second recovery stage (14) and co-operates with a regulating circuit (28) of the second clock (H2) to adjust the frequency of the chopping signals applied to the second transistor (T2).

* * * * *